May 17, 1960
M. A. YAKUBIK
2,936,814
METHOD OF EMBEDDING PARTICLES IN
PLASTIC SHEET MATERIAL
Filed June 25, 1956
2 Sheets-Sheet 1
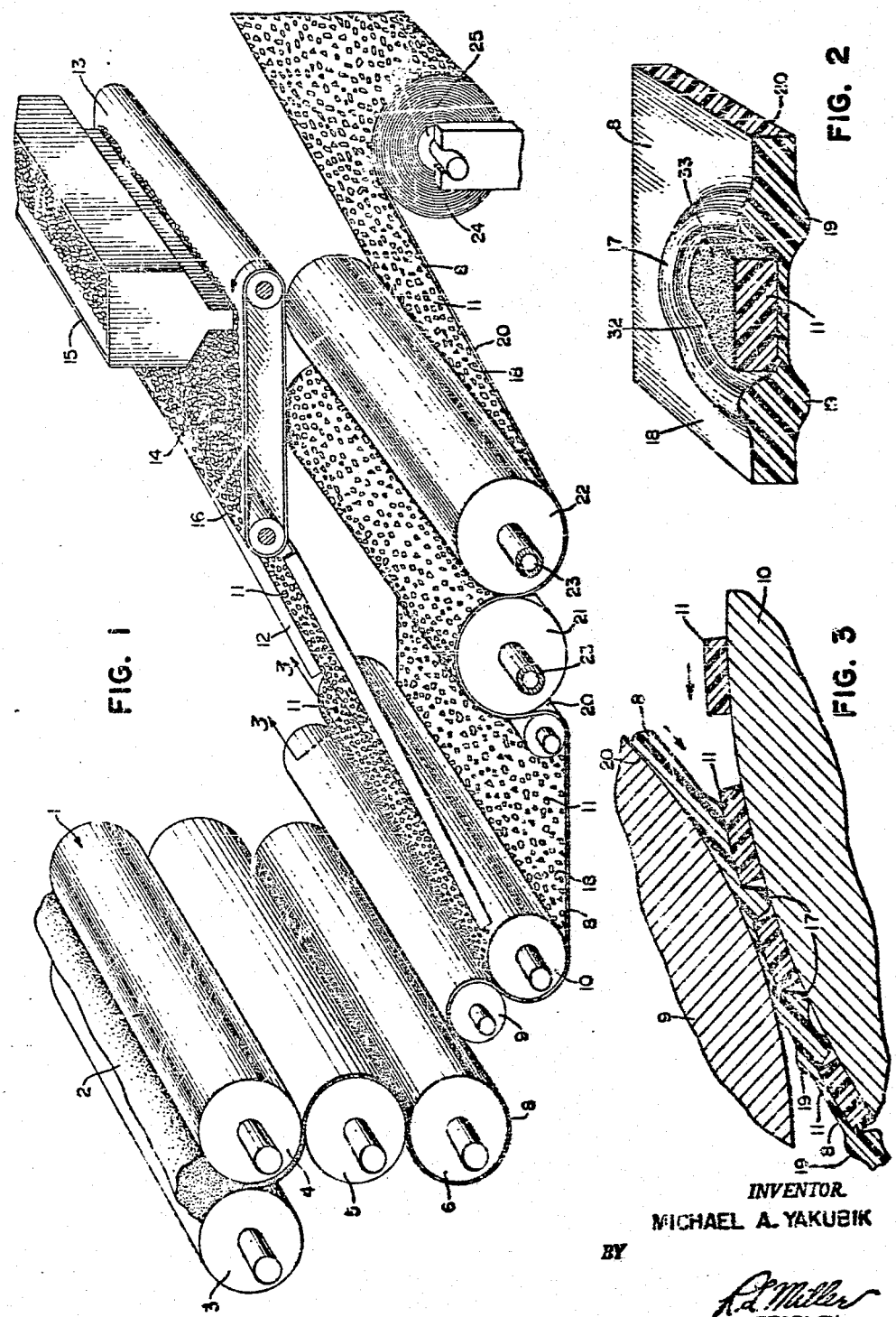
INVENTOR.
MICHAEL A. YAKUBIK
BY
ATTORNEY May 17, 1960
M. A. YAKUBIK
2,936,814
METHOD OF EMBEDDING PARTICLES IN
PLASTIC SHEET MATERIAL
Filed June 25, 1956
2 Sheets-Sheet 2
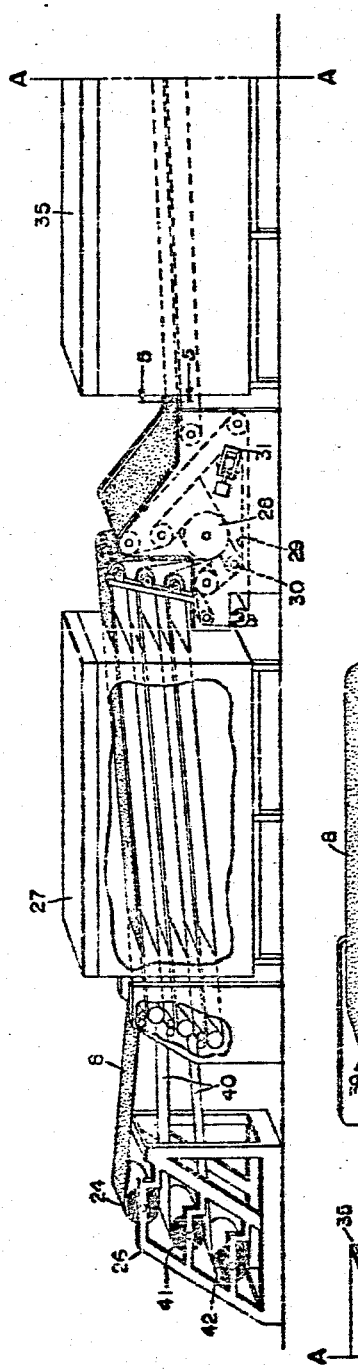
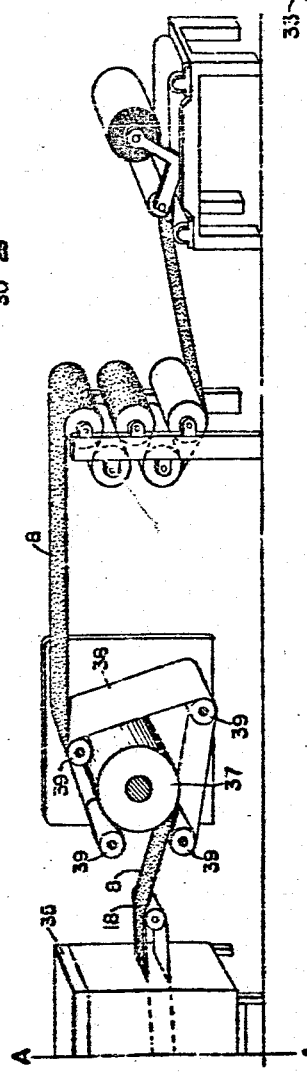
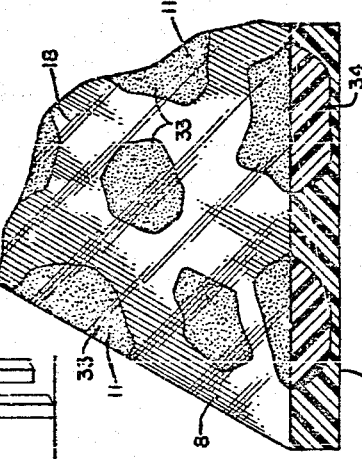
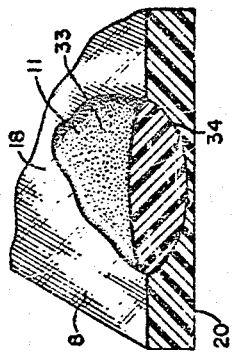
FIG. 4
FIG. 5
FIG. 6
INVENTOR.
MICHAEL A. YAKUBIK
BY
ATTORNEY

United States Patent Office 2,936,814
Patented May 17, 1960

2,936,814

METHOD OF EMBEDDING PARTICLES IN PLASTIC SHEET MATERIAL

Michael A. Yakubik, Hudson, Ohio, assignor to The Goodyear Tire & Rubber Company, Akron, Ohio, a corporation of Ohio Application June 25, 1956, Serial No. 593,391

3 Claims. (Cl. 154—26)

This invention relates to a process for the production of sheet material and more particularly for the production of sheet material having granules or particles inlaid or embedded in the sheet.

Multi-colored sheeting having particles embedded therein has been produced heretofore by several processes. One method which has been used is to drop colored plastisol resin paste on a solid sheet of resin just before it enters a calender. This operation squeezes the plastisol paste into the base sheet while the heat from the calender fuses the paste and the base sheet together, forming a composite product which may have several different colors. Another method which has been used is to force continuous strips of substantially less thickness than the sheet into the sheet by means of a calender to thereby fuse the sheet and strip together. None of the methods of the prior art discloses a method of inlaying particles into a base sheet by forcing the particle into the base sheet for a major portion of the thickness thereof and at the same time maintaining a sharp line of demarcation between the particles and base sheet.

It is an object of the present invention to provide a method of making a sheet of plastic having granules or particles embedded in the sheet and firmly bonded thereto.

Another object is to provide a method of producing a multi-colored plastic sheet in which pigmented particles or granules having a sharp outline similar to that obtained in terrazo flooring are embedded in the sheet for a major portion of the thickness thereof.

A further object is to provide a method of making a sheet of plastic material having granules or particles embedded therein at isolated locations in which the granules or particles are firmly bonded to the sheet and the particles project into the sheet for substantially the full depth thereof.

The above and other objects and advantages of the present invention will become more apparent from the following description and the drawings in which:

Fig. 1 is a perspective view showing apparatus for forming the plastic sheet material and uniting the granules or particles thereto;

Fig. 2 is a partial cross-sectional view through the sheet material and a particle after processing on the apparatus shown in Fig. 1;

Fig. 3 is an enlarged cross-sectional view taken along the lines 3—3 of Fig. 1;

Fig. 4 is an isometric side elevational view showing diagrammatically apparatus for cambering and ironing the sheet material which has been initially formed on the apparatus shown in Fig. 1;

Fig. 5 is a partial cross-sectional view taken through the sheet and a particle showing the condition thereof after the cambering operation;

Fig. 6 is an isometric view and partial cross-sectional view of the finished sheet.

Referring to Fig. 1 of the drawings, the calender unit 1 is supplied with a body 2 of plastic material which, by the action of cooperative heated rolls 3, 4, 5 and 6 is transformed into a substantially continuous strip 8. The calender unit 1 may take any conventional form and may employ any convenient number of heated rolls for the coincident application of heat and pressure to the body 2 of plastic material to facilitate the formation of the continuous strip 8. As the strip 8 passes around the roll 6 it is fed between the bite of auxiliary rolls 9 and 10 which are also heated. The auxiliary rolls 9 and 10 are spaced apart a distance only slightly greater, preferably less than 10% greater, than the thickness of the sheet 8. Granules or particles 11 having a pair of flat surfaces and made of plastic material of a color different from the sheet or strip 8 are fed from a chute 12 into the bite between the rolls 9 and 10. The lower discharge end of the chute 12 engages the surface of the roll 10 a short distance forward of the bite between the rolls 9 and 10 and the slope of the chute 12 is adjusted so that the lineal speed at which the particles slide thereon is substantially the same as the lineal speed of the sheet 8.

The size of the individual particles 11 can be varied over a wide range. The thickness of the particles should not be substantially larger than the thickness of the sheet 8 being made, so that the particles will not protrude unduly from the surface of the sheet. In practice, the particle size will ordinarily be at least about .20 mesh, i.e., at least about 0.84 millimeter in one or two dimensions, but thickness of the particles is not substantially larger than the thickness of the sheet.

The particles 11 are supplied to the chute 12 by a gravity feeding system comprising a conveyor belt 13 moving in a direction indicated by the arrow in Fig. 1. The belt is supplied with a thick layer 14 of particles 11 from hopper 15. The belt 13 is driven at a relatively slow speed so that as the layer 14 of particles 11 is moved toward the discharge end 16 of the belt 13, the particles fall onto the chute 12 in a predetermined pattern. If desired, an electromagnetic vibrator may be provided to oscillate the belt 13 at a frequency sufficient to cause the particles to settle into a more uniform layer on the surface of the belt 13 as they approach the discharge end 16 thereof. The thickness of the layer 14 and the speed of the belt 13 may be varied so as to control the quantity of particles and the average distance between particles discharged onto the chute 12 and roll 10. Preferably, the quantity of particles 11 fed to the roll 10 are of a number having an area substantially less than the area of the sheet 8 so that the particles are spaced from each other.

The temperature of the sheet 8 as it approaches the bite between rolls 9 and 10 is well above the softening point of the particular plastic material being used. The particles 11 as they enter the bite between rolls 9 and 10 are substantially at room temperature so that the particles, being harder than the sheet, are forced into the sheet for a substantial distance at least equal to a major portion of the thickness of the sheet 8. Since the contact between the sheet 8 and the bite of rolls 9 and 10 is on a transverse straight line and the thickness of the particles 11 is substantially the same as the thickness of the sheet 8, the particles 11 are forced deeply into the material of the sheet 8 perpendicular to the flat surfaces of the particle and at least the flat bottom surface of the particles is bonded or tacked to the sheet. But since the gauges of the sheet 8 and particles 11 are slightly less than the distance between the rolls 9 and 10, the material of the sheet 8 immediately adjacent each particle 11 is displaced above the plane of the sheet 8 around the entire periphery of each particle 11 and projects from both sides of the sheet, as shown in Fig. 2. A continuous shoulder 17 is formed on the upper surface 18 of the sheet adjacent to the periphery of the particle 11 and a similar shoulder 19 is formed on the bottom surface 20 of the sheet.

The sheet strip 8, after leaving the rolls 9 and 10 with the particles 11 bonded or tacked thereto at isolated spaced locations, is directed over a series of cooling drums 21 and 22 which are adapted to be chilled by the introduction to the hollow interior thereof of a cooling liquid carried by a suitable piping system 23 from a supply tank (not shown). After the strip 8 has been cooled to the proper degree to prevent tacking, it is coiled in the form of a roll or bundle 24 on a suitable roll insert 25. The bundle 24 may be made in any convenient size to facilitate handling of the material in the subsequent operations to be performed thereon.

After the bundle of material 24 of predetermined length has been built up on the roll 25, it is removed from the apparatus shown in Fig. 1 and stored temporarily to await the next step in the method. A number of bundles 24 are removed from storage and installed on each of the several supports 26 arranged in substantially parallel horizontal relationship to each other. The strip 8 is fed from the bundle 24 through a heating oven 27 wherein the strip 8 and the particles 11 tacked or bonded thereto are heated to soften the plastic material. The oven 27 may be heated in any suitable fashion, preferably by a bank of infra red lamps (not shown) which will enable the maintenance of a substantially constant range of temperatures throughout the overall dimensions of the oven 27. The temperature of the oven is maintained within a range of 325–375° F. dependent, of course, upon the nature of the thermoplastic material being processed. In general the temperature is at least above the softening temperature but is not in excess of the temperature at which the thermoplastic material comprising the strip will melt. The usual operating range of temperatures employed is such that the temperature of the stock 8 emerging from the oven 27 is between 290 and 310° F.

After the plastic sheet 8 emerges from the oven 27, the stock passes between an internally heated drum 28 and an endless pressure belt 29 supported by a plurality of pulleys 30. The belt is provided with a jack or other suitable form of adjustment 31 for tensioning the belt 29 and compressing the belt against the drum 28. The compression between the belt 29 and drum 28 is preferably approximately ten pounds per square inch and since the temperature of the stock is above the softening point thereof, but below the melting point, the compression of the sheet 8 between the belt and the drum causes the material in the particles 11 and the material in the shoulders 17 and 19 immediately adjacent the particles 11 to flow laterally into the annular concavity 32 located about the periphery of the particles 11 so that the particle is firmly bonded to the sheet without any intermixing or overlapping of the material of the particle 11 and sheet 8. In addition, the relatively low pressure between the belt and drum forces the periphery of the surface 33 of the particle 11 to flow into the same plane as the surface 18 of the sheet 8 so that the surface 33 of the particle 11 is convex in cross section as shown in Fig. 5 of the drawings and the surface 34 of the particle 11 is likewise convex in cross section. In effect, then, the compression between the belt 29 and drum 28 cambers the surface 33 of the particles 11 so that the peripherial edge of each particle is flush with the surface 18 of the sheet 8 while still maintaining a sharp and distinct outline of the particle similar to its original outline, and at the same time smooths the shoulders 17 and 19 substantially flush with surfaces 18 and 20.

After passage through the first continuous press comprising the drum 28 and belt 29, the sheet 8 is passed through a second heating oven 35 similar in construction to the oven 27 and maintained at approximately the same temperature as the oven 27, preferably within a range of 325–375° F. The stock emerging from the oven 37 has a temperature in the range of 330–370° F. and is passed through a second continuous press having a drum 37 and continuous belt 38 which is supported on a plurality of rolls 39. The temperature of drum 37 is maintained at a temperature substantially cooler than the sheet 8 emerging from the oven 35 and the pressure between the drum and belt 39 is substantially higher than the pressure between the drum 28 and belt 29 of the first continuous pressing unit and preferably approximately 40 pounds per square inch. As the sheet enters the bite between the drum 37 and the belt 38, the surfaces 33 of the particles 11 which project above the surface 18 of the sheet 8 contact the cooled drum 37 before the sheet. Since the drum 37 is maintained at a temperature between 150–170° F., the material of the particles 11 immediately adjacent the surface 33 is rapidly cooled and hardened relatively faster than the material adjacent the surface 18 of the sheet 8. Simultaneously with the cooling of the surface 33 of the particles 11, the sheet 8 and particles 11 are compressed between the drum 37 and belt 38 at a pressure of approximately 40 pounds per square inch which irons or smooths the particle 11 flush with the surface 18 of the sheet while maintaining the distinct sharp outline of the particle 11 as a result of the cooling of the surface 33 thereof. As the sheet 8 emerges from the second continuous press, the surfaces 33 of the particles are ironed or smoothed so that they are flush with the surface 18 of the sheet as shown in Fig. 6. Furthermore, a distinct sharp outline between the particles 11 and sheet 8 is maintained and the configuration of the particles 11 to their original configuration is retained so that a distinctively attractive and durable sheeting material is formed in which the particles are spaced, isolated, and embedded or inlaid in the sheet for a major portion of the thickness of the sheet.

The sheeting material of this invention can be formed in one continuous self-supporting sheet, as indicated above, or it may be formed to a suitable backing material. The backing material may be a thermoplastic resin, fabric, asphalt impregnated paper or other suitable material which is plied to the sheet 8, preferably by the first continuous press. The backing material 40, fed from the rolls 41 and 42, in the form of rolls or bundles is preferably heated in the oven 27 and fed into the bite between the belt 29 and drum 28 simultaneously with the strip 8.

This invention is well adapted for making plastic sheet material in which the sheet comprises thermoplastics of organic polymerization products such as vinyl chloride, styrene, polyethylene, acrylicnitrile, acrylic or methylacrylic esters or polymerization products of the mixtures of the aforementioned compounds with each other or with other compounds polymerizable under the same conditions, as well as the conversion products. The process is of particular significance in the manufacture and treatment of polymerization products of vinyl chloride including vinyl chloride alone or copolymers of vinyl chloride and other polymerizable substances. It will be readily understood that the addition of certain softening agents, pigments, die stuffs, or common stabilizing agents may be made to the substances without materially affecting their reaction to the procedure employed in the present invention. Furthermore, although it is contemplated that the particles be made of the same material as the sheet 8, it is within the contemplation of this invention that the particles 11 and sheet 8 be made of different materials within the classes set forth above.

While certain representative embodiments and details have been shown for the purpose of illustrating the invention, it will be apparent to those skilled in this art that various changes and modifications may be made therein without departing from the spirit or scope of the invention.

What is claimed is:

1. A process for the production of decorative thermoplastic sheet material having spaced, isolated particles embedded in the sheet for a major portion of the thickness of the sheet, comprising forming a sheet of thermoplastic material, applying thermoplastic particles in spaced relationship onto the upper surface of said sheet, said particles having a pair of flat parallel surfaces and a thickness not substantially larger than the thickness of the sheet, pressing said particles into said sheet in a direction perpendicular to said parallel surfaces by passing the sheet and particles through the nip of a pair of rolls set apart a distance slightly greater than the thickness of the sheet, said pressing step being made while the particles are at a substantially lower temperature and harder than said sheet to cause the unexposed surface of the particles to bond to the plastic sheet and to penetrate a major portion of the thickness of said sheet and to cause the sheet material adjacent each particle to upset into a plane above the sheet, thereafter, heating both the sheet and particles bonded thereto at least to the minimum softening point of the sheet, pressing said upper surface of the heated sheet to camber the exposed surface of said particles and the adjacent upset material of the sheet, reheating the sheet to at least the minimum softening point of the sheet, and thereafter passing the heated sheet with the upper surface of the sheet engaging a press having a temperature substantially less than that of the heated sheet to press the exposed surface of said particles flush with the surface of the sheet whereby the configuration of the particles in the completed sheet is substantially the same as that of the original particles.

2. A method as claimed in claim 1 in which said particles are applied to said sheet by delivering a layer of said thermoplastic particles in spaced relationship to the nip of said rolls, said layer moving at a velocity equal to the velocity of said sheet passing through the nip of said rolls.

3. A process as claimed in claim 2 in which said layer of particles are fed onto the surface of one of said rolls a short distance from the nip of said rolls, said layer being carried by said one roll into the nip thereof.

References Cited in the file of this patent

UNITED STATES PATENTS

| | | |
|---|---|---|
| 1,635,684 | Mell | July 12, 1927 |
| 1,939,045 | Fredriksen | Dec. 12, 1933 |
| 2,042,964 | Rinehart | July 2, 1936 |
| 2,154,438 | Conklin | Apr. 18, 1939 |
| 2,706,310 | Eckler et al. | Apr. 19, 1955 |
| 2,775,994 | Rowe | Jan. 1, 1957 |